(12) United States Patent
Dong et al.

(10) Patent No.: US 9,350,240 B2
(45) Date of Patent: May 24, 2016

(54) POWER CONVERTER SOFT START CIRCUIT

(71) Applicant: Texas Instruments Incorporated, Dallas, TX (US)

(72) Inventors: Xianhui Dong, Beijing (CN); Xiaojun Xu, Beijing (CN); Shuchun Zhang, Beijing (CN); Daniel Jing, Beijing (CN)

(73) Assignee: Texas Instruments Incorporated, Dallas, TX (US)

( * ) Notice: Subject to any disclaimer, the term of this patent is extended or adjusted under 35 U.S.C. 154(b) by 240 days.

(21) Appl. No.: 14/247,285

(22) Filed: Apr. 8, 2014

(65) Prior Publication Data
US 2015/0162830 A1 Jun. 11, 2015

Related U.S. Application Data

(63) Continuation of application No. PCT/CN2013/088584, filed on Dec. 5, 2013.

(51) Int. Cl.
*H02M 1/36* (2007.01)
*H02M 3/158* (2006.01)

(52) U.S. Cl.
CPC ............... *H02M 3/158* (2013.01); *H02M 1/36* (2013.01)

(58) Field of Classification Search
CPC ........ H02M 1/36; H02M 3/158; H02M 3/156
USPC ......... 323/901, 238, 242, 282, 285, 284, 271, 323/321, 315, 316, 280, 277, 273; 363/49
See application file for complete search history.

(56) References Cited

U.S. PATENT DOCUMENTS

| | | | |
|---|---|---|---|
| 7,157,943 B2 | 1/2007 | Sanzo | |
| 7,459,891 B2 | 12/2008 | Al-Shyoukh et al. | |
| 7,466,115 B2 | 12/2008 | Biagi | |
| 7,619,397 B2 | 11/2009 | Al-Shyoukh | |
| 8,125,800 B2 | 2/2012 | Forghani-Zadeh et al. | |
| 8,330,532 B2 * | 12/2012 | Nikolov | G05F 1/56 323/280 |
| 9,018,923 B2 * | 4/2015 | Parkhurst | H02M 3/156 323/238 |
| 2008/0136382 A1 | 6/2008 | Chellamuthu et al. | |
| 2009/0115379 A1 * | 5/2009 | Al-Shyoukh | G05F 1/56 323/238 |
| 2009/0167200 A1 | 7/2009 | Brokaw et al. | |
| 2009/0174385 A1 * | 7/2009 | Yen | H02M 1/36 323/288 |
| 2012/0025801 A1 * | 2/2012 | Hirose | G05F 3/242 323/313 |
| 2015/0326106 A1 * | 11/2015 | Li | H02M 3/158 323/271 |

OTHER PUBLICATIONS

Texas Instruments, "Precision Adjustable Current Limited Power Distribution Switch With 4.5v. To 18v Input Voltage, 3A Output Current Synchronous Buck Regulator", TPS65281, TPS65281-1; SLVSBH7B—Jul. 2012, revised Dec. 2012, 33 pgs.

(Continued)

*Primary Examiner* — Gary L Laxton
*Assistant Examiner* — Kyle J Moody
(74) *Attorney, Agent, or Firm* — Lawrence J. Bassuk; Frank D. Cimino

(57) ABSTRACT

PWM control circuits and soft start circuitry thereof are presented in which a source follower circuit provides an input to a pulse generator error amplifier during startup according to a lower one of an internal soft start circuit ramp signal and a voltage across and externally connected capacitor, with a current source connected to the source follower to limit the charging current supplied to the externally connected capacitor.

20 Claims, 5 Drawing Sheets

(56) References Cited

OTHER PUBLICATIONS

Texas Instruments, "3-V to 6-V Input, 6-A Output Synchronous Buck PWM Switcher With Integrated FETs (SWIFT)", TPS54611, TPS54612, TPS54613, TPS54614, TPS54615, and TPS54616; SLVS400C—Aug. 2001, Revised Apr. 2005, 24 pgs.

Texas Instruments, "Low-Input Voltage-Mode Synchronous Buck Controller", TPS4000, TPS4001, TPS4002, TPS4003, TPS4004, TPS4005, SLUS507C—Jan. 2002, Revised Jun. 2004, 20 pgs.

Texas Instruments, "3-V to 6-V Input, 3-A Output Synchronous-Buck PWM Switcher With Integrated FETs (SWIFT)", TPS54310; SLVS412B—Dec. 2001, Revised Apr. 2005, 17 pgs.

* cited by examiner

POWER CONVERTER SOFT START CIRCUIT

REFERENCE TO RELATED APPLICATIONS

This application is a continuation of, and claims priority to and the benefit of, International Application No PCT/CN2013/088584, filed Dec. 5, 2013 and entitled "Power Converter Soft Start Circuit", the entirety of which is hereby incorporated by reference.

FIELD OF THE INVENTION

The present disclosure relates to soft starting DC-DC converters, and pulse width modulation (PWM) controllers therefor.

BACKGROUND

DC-DC converters typically include one or more switches that are selectively actuated to provide a controlled DC output voltage or current based on a received DC input. The output power is regulated by controlling the pulse width or on time of the signaling provided to the converter switch or switches according to an error signal representing the difference between the actual output voltage or current and a desired value (pulse width modulation or PWM). A capacitor is typically connected at the converter output in parallel with a driven load, in order to stabilize the converter output voltage and provide a source for load current. At power up, however, the output capacitor is initially discharged, and the difference between the output voltage and the desired value may be large, causing the pulse width modulation control to provide large amounts of current to the output. The output capacitor may thus experience high levels of inrush current during startup, which may damage or degrade the output capacitor. Soft starting techniques may be used to limit the amount of inrush current provided to the output capacitor during startup, including the provision of on-board (internal) soft start circuitry in the pulse width modulation controller. However, internal soft start circuits typically provide a fixed or predetermined soft start time during which the output current is limited, and the desired soft start timing specification may be different for different applications. For example, the maximum tolerable level of inrush current may be dictated by the particular output capacitor used. Accordingly, a combination of internal and external soft start circuitry may be used, allowing a user to either employ the internal soft start circuit and the associated fixed soft start time, or to connect one or more external components to the pulse width modulation controller to set a different (e.g., longer) soft start time, thereby further limiting the output capacitor inrush current. The internal and external soft start circuitry is often connected to the closed loop feedback error amplifier circuit, in order to artificially modify (e.g., lower) the error signal from which the PWM switching control signal or signals is/are generated. However, accommodating both internal and external soft start circuitry requires two additional inputs to the error amplifier circuitry. The input transistors of the error amplifier are typically of very large dimensions in order to minimize input offsets, and thus a larger integrated circuit die size is needed if four error amplifier inputs are used. In addition, the input transistors of the error amplifier are typically closely matched, such as in differential input stage implementations used in comparing a setpoint or reference value with a feedback value, and the provision of a large number of error amplifier inputs may result in matching difficulty due to the large device sizes. Accordingly, there is a continuing need for improved control circuits for pulse width modulation control of DC-DC converters with internal as well as external soft start circuits, without increased device size and device matching problems associated with conventional control circuits.

SUMMARY

The present disclosure provides PWM control circuitry for controlling a DC-DC converter, including pulse generation circuitry together with internal and external soft start control features. The pulse generation circuit includes an error amplifier with three inputs for receiving a soft start input signal, a reference signal and a feedback signal, respectively, as well as an output providing an error signal representing the difference between the feedback signal and a lower one of the soft start and reference signals. A comparator circuit receives the error amplifier output signal as well as a periodic ramp signal, and provides a PWM output signal for operation of one or more switches of the DC-DC converter accordingly. The control circuit includes an internal soft start circuit providing a rising output signal to the first error amplifier input during startup, and an external soft start terminal is also connected to the first error amplifier input, allowing connection of an external capacitor to at least partially control the rise time of the first error amplifier input voltage during startup. In this manner, a fourth error amplifier input is not needed, thereby reducing the control circuit dimensions and avoiding or mitigating device mismatch issues, while allowing use of a predetermined internal soft start time or a configurable soft start time by connection of one or more external soft start circuit components to the controller.

In certain embodiments, the internal soft start circuit includes an internal ramp circuit such as a capacitor amplifier with a first capacitor connected to a current source to provide a rising voltage with a generally fixed voltage rate of change during control circuit startup. The internal soft start circuit includes output circuitry providing a rising internal soft start circuit output signal to the first error amplifier input at least partially according to the voltage across the first capacitor. In certain embodiments, the soft start output circuit includes a source follower transistor with a gate terminal connected to the first capacitor and a source terminal connected to the first error amplifier input. A current mirror circuit may be provided to sink current from the source terminal of the source follower to set the source follower transistor gate-source voltage based on the voltage of the first capacitor during startup. In certain implementations, moreover, the soft start output circuit includes another current source providing current to the drain of the source follower transistor to limit a charging current of any capacitor connected to the external soft start terminal, where this additional current source is not directly connected to the external soft start terminal.

In various embodiments, therefore, the soft start circuit output signal provided to the first error amplifier input will generally track the rising voltage of the internal soft start circuit first capacitor during startup, unless a fairly large external capacitor is connected to the external soft start terminal, in which case the signal provided to the first error amplifier input will rise at a slower rate. Thus, a user can utilize the on-board soft start circuitry to implement a predetermined soft start time, or may selectively connect an external capacitor to configure a longer soft start time as desired, and no additional error amplifier input need be provided to implement the combined internal and external soft start circuit capabilities. As a result, the control circuit dimensions are reduced and error amplifier input component matching problems are advantageously mitigated compared to designs utilizing four error amplifier inputs.

DESCRIPTION OF THE VIEWS OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1:
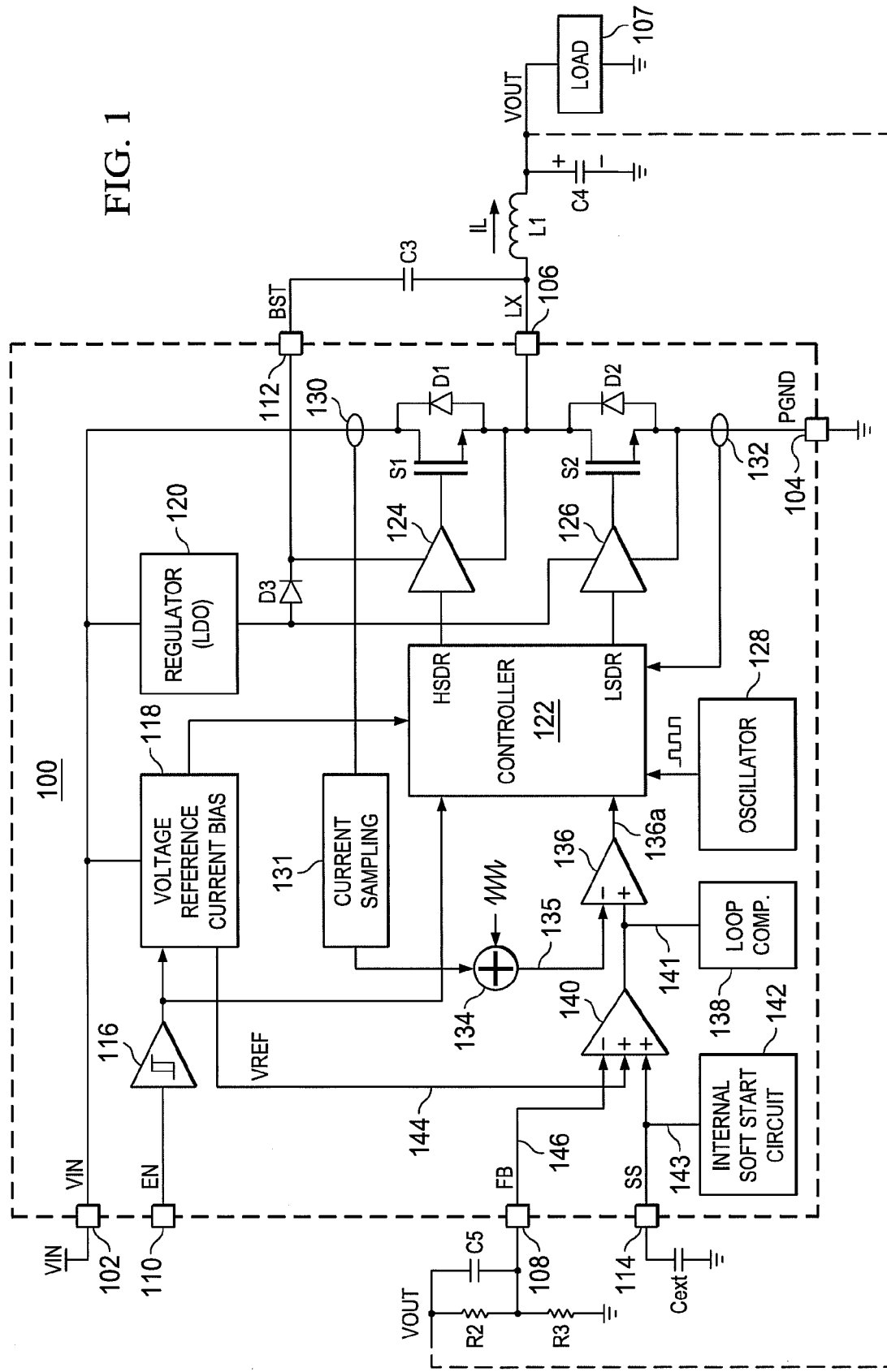
FIG. 1 is a schematic diagram illustrating an exemplary DC to DC converter with a PWM control circuit having soft start circuitry in accordance with one or more aspects of the present disclosure.

One or more embodiments or implementations are hereinafter described in conjunction with the drawings, wherein like reference numerals are used to refer to like elements throughout, and wherein the various features are not necessarily drawn to scale. The present disclosure provides power converter control circuits for PWM control of DC-DC converters. Various exemplary embodiments are hereinafter illustrated and described in connection with buck converter type systems, although the various concepts of the present disclosure may be employed in association with any type of DC-DC converter architecture. In addition, while the illustrated examples employ complementary PWM control of high side and low side switching devices, the described concepts can be implemented in switching converters using only a single switching device and/or in converters employing more than two pulse width modulated switches.

Figure 2:
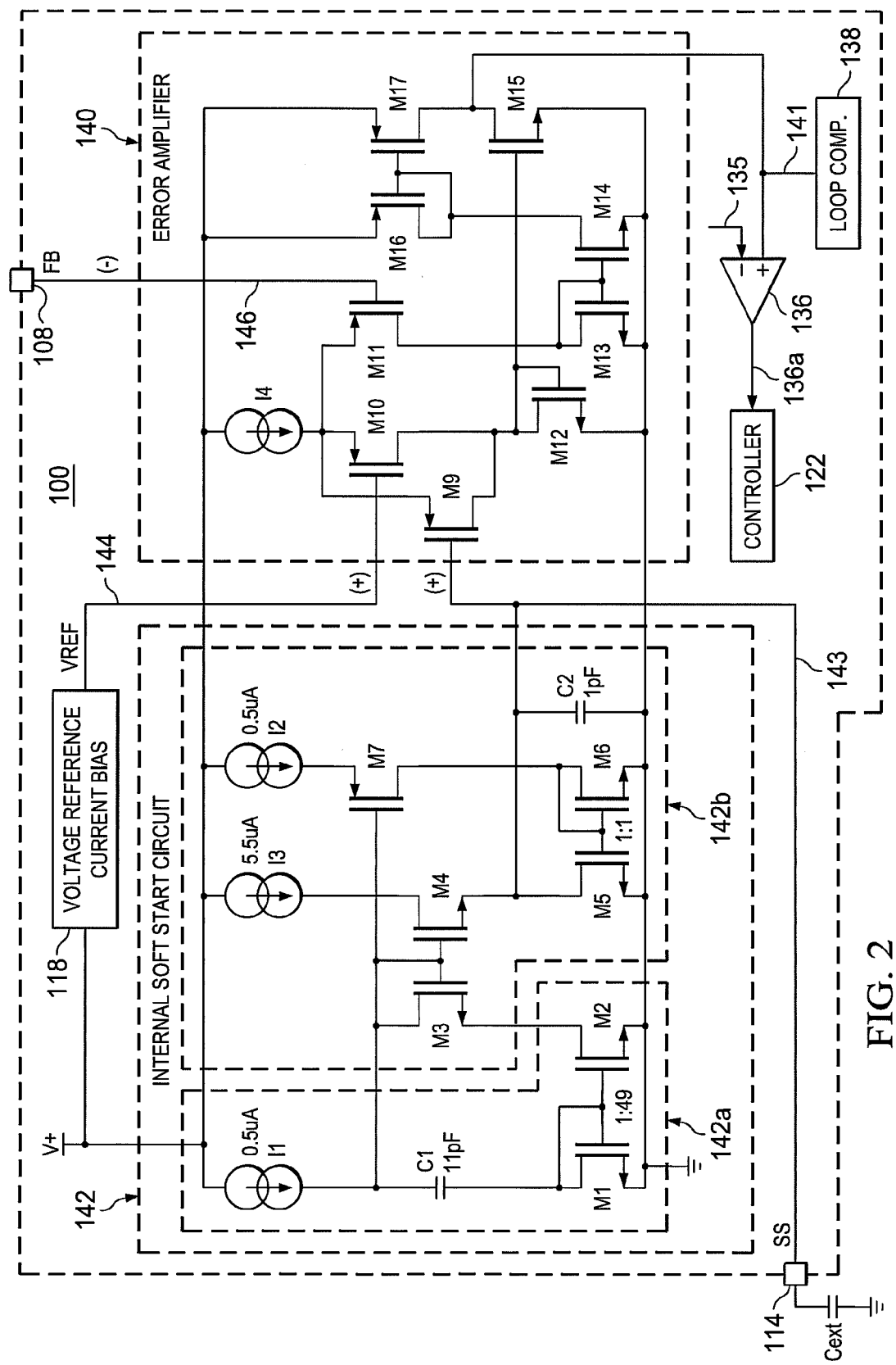
FIG. 2 is a schematic diagram illustrating further details of the soft start circuitry and pulse generation circuitry of the control circuit in FIG. 1.

Referring initially to FIGS. 1 and 2, an exemplary pulse width modulation control circuit 100 is illustrated, which may be implemented as an integrated circuit having various terminals or pins 102, 104 106, 108, 110, 112 and 114 as shown for interconnection with other components of a DC-DC converter system. In the example of FIG. 1, moreover, the integrated circuit 100 includes on-board power switching devices S1 and S2 along with corresponding high side and low side drivers 124 and 126, although some or all of these components may be external to the integrated circuit 100 in other possible embodiments. Similarly, the illustrated control circuit 100 provides terminals 106, 108 and 112 for connection to an external buck converter output inductor L1, output capacitor C4, bootstrap capacitor C3 and feedback circuit R2, R3 and C5, but other embodiments are possible in which one or more of these components are provided in the integrated circuit 100.

The system shown in FIG. 1 implements a peak current mode buck converter operated by the integrated circuit 100, where the control circuit 100 provides the advantages of combined internal and external soft start control as well as closed loop feedback control of the output voltage VOUT provided to a load 107 connected in parallel with the output capacitor C4. In this implementation, moreover, the output voltage VOUT is regulated according to an internal reference voltage VREF, but other implementations are possible in which the control circuit 100 provides an external pin or terminal (not shown) for regulation of the output according to an externally supplied setpoint signal. Input power is provided to the circuit 100 by connection of a DC voltage VIN to a power input terminal 102, and the circuit 100 also includes a power ground connection terminal 104 for connection to a circuit ground. In addition, the circuit 100 includes an enable input terminal 110 for receiving and enable signal EN allowing the circuit 100, and hence operation of the DC-DC converter, to be selectively enabled or disabled. A Schmitt trigger 116 receives the enable signal EN and provides a logic output (active high in one example) to activate a voltage reference current bias circuit 118, which in turn provides the reference voltage VREF used for regulating the DC-DC converter output (e.g., about 0.8 V in one example). The input voltage VIN from pin 102 is also connected to a low dropout (LDO) regulator circuit 120, which provides an output (e.g., 6 V in one example) for powering switch drivers 124 and 126, with the high side driver 124 being connected to the output of the regulator 120 via a diode D3 for bootstrap operation.

High and low side output switches S1 and S2 are connected in series with one another between the input voltage terminal 102 and the power ground terminal 104. The output switches S1 and S2 are NMOS transistors with corresponding diodes D1 and D2 connected as shown in FIG. 1, although other embodiments are possible in which different types of switches are used, and/or the switches may be external to the integrated circuit 100. Pulse width modulated gate control signals are provided to the switches S1 and S2 by corresponding high and low side drivers 124 and 126, respectively, where the drivers 124 and 126 receive a respective high and low side driver signals from corresponding outputs HSDR and LSDR of a controller 122. An inductor output terminal 106 (LX) facilitates connection of the external inductor L1 between the control circuit 100 and the load 107, where the output terminal 106 is connected to the common connection of the high side and low side output switches S1 and S2 as shown.

A bootstrap terminal 112 (BST) is provided for connection of a bootstrap capacitor C3 between the output terminal 106 (LX) and an upper supply rail used by the high side driver 124. The high side switch S1 in this case is an NMOS device, and therefore the gate voltage needs to be higher than the output voltage at the LX terminal 106 in order to turn on S1. In operation, when the low side switch S2 is turned on, the lower terminal of C3 is connected to ground, and the upper terminal of C3 is connected through the diode D3 to the LDO regulator output voltage (e.g., 6 volts), causing the capacitor C3 to charge up to the regulated voltage output (minus a diode drop of D3). When the high side switch S1 is thereafter turned on, and S2 is turned off, the voltage at the LX terminal 106 (at the lower terminal of C3) is connected to the input voltage VIN, and the voltage at the BST terminal 112 will be about 6 V above the input voltage VIN. The high side driver 124 is connected to this higher voltage, and therefore the driver 124 can provide a gate signal to S1 of sufficient voltage turn on the high side switch S1.

An oscillator 128 provides a clock signal for operation of the controller 122, and may also drive a ramp generator circuit (not shown) to provide a periodic ramp signal to a slope compensation circuit 134. The PWM operation of the buck converter system is synchronized with the clock signal output by the oscillator 128, and the high side driver signal HSDR is turned on once every cycle of the oscillator clock output. In one example, the PWM frequency is about 400 kHz to about 2.0 MHz, and can be adjusted. As seen in FIG. 1, moreover, current sensors 130 and 132 may be provided to sense the high and low side currents, with the high side current feedback signal being sampled by a current sampling circuit 131 for selective offsetting of a ramp signal via the slope compensation circuit 134. The slope compensation circuit 134 in this case is used to facilitate peak current mode buck converter operation while keeping the current loop stable, although not a strict requirement of the present disclosure. The slope compensation 134 provides a periodic ramp signal 135 to a comparator 136 providing a pulse width modulated output signal 136a to the controller 122, and the controller 122 may use the low side current signal provided by the sensor 132.

Figure 7:
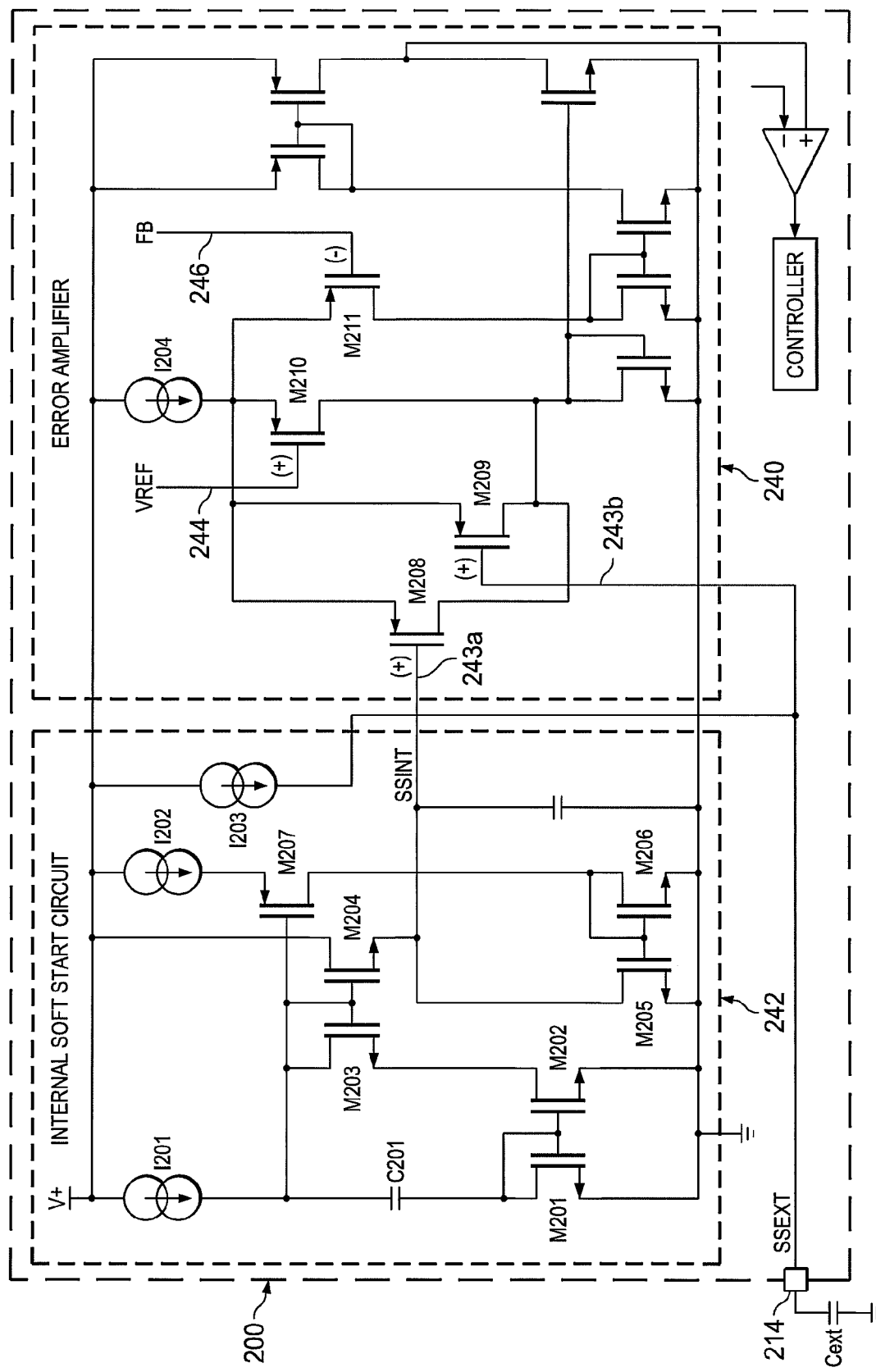
FIG. 7 is a schematic diagram illustrating another soft start circuit architecture using a dedicated current source and error amplifier input for an externally connected soft start capacitance.

As further shown in FIG. 1, the control circuit 100 includes a pulse generation circuit including an error amplifier 140, a loop compensation circuit 138, and a comparator 136, and also includes an internal soft start circuit 142 as well as an external soft start terminal 114. The error amplifier 140 provides an error amplifier output signal 141 as an input to the comparator 136 for comparison with the periodic ramp signal 135 provided by the offset circuit 134. The circuit 100 advantageously facilitates a combination of both internal and external soft start capabilities via the internal soft start circuit 142 and the external soft start terminal 114 sharing a single (first) input 143 to the error amplifier 140. As described further below in connection with FIG. 2, the differential input of the error amplifier 140 in certain implementations only includes three inputs, whereby integrated circuit die size can be conserved and input component matching performance can be improved compared with four-input implementations such as shown in FIG. 7.

The error amplifier 140 includes a first input 143 (+) receiving a soft start input signal SS, along with a second error amplifier input 144 (+) receiving a reference voltage signal VREF, and a third error amplifier input 146 (−) receiving a feedback signal FB representing an output condition of the DC-DC converter (e.g., output voltage VOUT in this example). The error amplifier 140 has an output providing an error amplifier output signal 141 representing a difference between the feedback signal FB and a lower one of the soft start signal SS and the reference voltage signal VREF. In operation, the error amplifier 140 amplifies the difference between the feedback signal FB provided at the third (inverting) input 146 and a lower one of the soft start and reference signals provided to the (non-inverting) inputs 143 and 144 to generate the error amplifier output signal 141. The output signal 141, in turn, is optionally connected to a loop compensation circuit 138 (e.g., FIGS. 3 and 4 below) and is provided as an input to the comparator 136 for comparison with the ramp signal 135. The comparator circuit 136 has a first input (+) receiving the error amplifier output signal 141, a second input (−) receiving the ramp signal 135 from the slope compensation circuit 134, and an output providing a pulse width modulated output signal 136a according to the error amplifier output signal 141 and the periodic ramp signal 135. In operation, the PWM output signal 136a is high when the error amplifier output signal 141 is above the ramp signal 135, and otherwise is low, and the comparator may provide some level of hysteresis. As a result, a stream of pulses will be provided in the output signal 136a, with the pulse width (the percentage of time in which the signal 136a is high) will generally be proportional to the level of the error amplifier output signal 141.

In steady state operation of the DC-DC converter system, moreover, the level of the error amplifier output signal 141 will represent an error indicating the difference between the feedback signal at the input 146 and the reference signal at the input 144. In the illustrated implementation, a resistive divider circuit is provided by external resistors R2 and R3, along with a stabilizing or filtering capacitor C5 to provide the feedback signal FB to the third error amplifier input 146 via terminal 108 by connection of R2 and C5 to the output voltage at the load 107 as indicated in dashed line in FIG. 1. The controller 122 receives the PWM control signal 136a from the comparator 136, as well as the pulse stream signal from the oscillator 128, and generates complementary high and low side driver signals MSDR and LSDR that are provided as inputs to the high and low side driver's 124 and 126, respectively. This closed-loop configuration allows adjustment of the pulse widths in the output signal 136a to drive the output voltage VOUT at the load 107 to correspond with a reference level represented by the reference voltage VREF.

During startup, however, the output capacitor C4 in FIG. 1 begins at a discharged condition, and thus closed loop operation strictly according to the feedback signal FB might result in excessive inrush current levels at the capacitor C4. Accordingly, the circuit 100 includes an internal soft start circuit 142 providing an output to the first error amplifier input 143. In addition, the external soft start terminal 114 is directly connected to the first error amplifier input 143, allowing a user to connect an external capacitor Cext between the first error amplifier input 143 and the circuit ground to at least partially control the rise time of the voltage at the first error amplifier input 143 during startup of the control circuit 100. In practice, the internal soft start circuit 142 provides a signal SS to the first error amplifier input 143 having a voltage generally rising during startup of the circuit 100, wherein the rate of change of the signal voltage will be at a first (generally fixed) rate if no external capacitor is connected to the terminal 114 or if a relatively small external capacitor is connected. However, connection of a large capacitance Cext between the soft start terminal 114 and the circuit ground will cause the ramp rate of the soft start signal provided to the first error amplifier input 143 to be longer than the rate of the internally generated soft start signal.

Referring also to FIG. 2, further details of an exemplary internal soft start circuit 142 and error amplifier circuit 140 are illustrated, where the internal soft start circuit 142 includes a capacitor amplifier circuit 142a and an output circuit 142b. While the illustrated soft start circuit 142 provides a capacitor amplifier 142a, other embodiments are possible in which the internal soft start circuit 142 provides another type of internal ramp circuit which generates a rising internal soft start voltage signal having a fixed rate of change during startup of the control circuit 100. In the illustrated embodiment, the capacitor amplifier circuit 142a includes a first capacitor C1 with an upper first terminal connected to a current source I1 and a lower second terminal connected to a first current mirror formed by NMOS transistors M1 and M2. The capacitor amplifier circuit 142a provides a rising voltage at the first terminal of the first capacitor C1 during startup of the control circuit 100, with the current source I1 providing charging current to charge the first capacitor C1 from an initial zero voltage upon power up of the circuit 100. The output circuit 142b provides a rising internal soft start circuit output signal to the first error amplifier input 143 based at least partially on a voltage across the first capacitor C1 during startup of the control circuit 100, and an external soft start terminal 114 connected directly to the first error amplifier input 143 allows connection of an external capacitor Cext between the first error amplifier input 143 and a circuit ground to at least partially control a rise time of a voltage at the first error amplifier input 143 during startup of the control circuit 100.

The internal soft start output circuit 142b includes a second current mirror formed by NMOS transistors M3 and M4, with M3 connected between M2 of the first current mirror and the upper terminal of C1, and with M4 connected between the first capacitor C1 and the first error amplifier input 143, where the gates of M3 and M4 are connected to the upper terminal of C1 as shown. In this configuration, the current flowing through M2 and M3 is proportional to the level of the first current source I1, with the ratio (1:49) between M1 and M2 in this example providing that the current used to charge the capacitor C1 is approximately ⅟₅₀ of I1, with the remainder of the current from I1 flowing through M2 and M3. The voltage at the upper terminal of capacitor C1 is equal to the voltage across C1 plus the gate-source voltage of M2. VGS of M2, in turn, is set according to the current flowing through M2 and M3, and the level of this current is determined by the current flowing through M4 and M5 by virtue of the current mirror configuration of M3 and M4. The output circuit 142b of the internal soft start circuit 142 in FIG. 2 also includes a third current mirror circuit formed by M5 and another an NMOS transistor M6 (ratio 1:1), whereby the current through M5 provides a tail current for the transistor M4. In addition, a PMOS transistor M7 is connected between a second current source I2 (where I1=I2=0.5 μA in this example) and the gate and drain of M6, with the gate of M7 being connected to the upper terminal of C1. Thus, M7 is operated according to the voltage at the upper terminal C1 to control current flow from the second current source I2 to the third current mirror circuit M5, M6 to maintain a conduction state of the second transistor M4 of the second current mirror circuit M3, M4 during startup of the control circuit 100. As seen in FIG. 2, therefore, M4 is configured as a source follower with a source terminal connected to the second transistor M5 of the third current mirror circuit and to the first error amplifier input 143. In the illustrated implementation, moreover, an output filtering capacitor C2 (e.g., 1 pF) is provided between the first error amplifier input 143 and the circuit ground.

In operation with no external capacitor or only a small capacitor Cext connected to the external soft start terminal 114, M4 operates as a source follower to provide the rising internal soft start circuit output signal to the first error amplifier input 143 having a voltage generally equal to the voltage across the first capacitor C1 during startup of the control circuit 100. In this regard, the voltage at the upper terminal of C1 is equal to the voltage across C1 plus the gate-source voltage of M2, and the gate-source voltage of the source follower transistor M4 is approximately the same as that of M2. As a result, in source follower operation, the voltage signal SS at the source of M4 (provided as the first error amplifier input 143) is approximately equal to the voltage across C1. In the illustrated implementation, a 1 ms internal soft start time is provided by operation of the capacitor amplifier circuit 142a in combination with the source follower transistor M4 and the first second and third current mirror circuits. The internal soft start time is therefore given by the following equation (1.1) for conditions in which the external capacitor Cext is not installed or Cext is relatively small, with M4 operating as a source follower:

$$t_{ss\_int}=(VREF \times C1)/(I1/(49+1)). \tag{1.1}$$

The current mirrors of the output circuit 142b, moreover, are powered during startup by operation of the PMOS transistor M7, whose gate voltage is controlled by the voltage at the upper terminal of C1. As a result, M7 is turned on at power up of the circuit 100, and provides current from the current source I2 to the current mirror circuit M5, M6. Thereafter, as the voltage across C1 rises, M7 eventually turns off, thereby ceasing the current flow from I2, whereby the configuration of the output circuit 142b consumes power from a positive voltage supply terminal V+ only during power up of the circuit 100.

As further seen in FIG. 2, the illustrated output circuit 142b also includes a third current source I3 providing a current (5.5 μA in one example) to the drain of M4 in order to limit the charging current of the external capacitor Cext (if connected to the terminal 114), where M4 provides the soft start circuit output signal SS to the first error amplifier input 143 having a voltage generally equal to a lower one of the voltage across the first capacitor C1 and a voltage across the external capacitor Cext. Thus, M4 operates as a source follower to provide the rising soft start circuit output signal SS according to the charging of C1 if Cext is small or not connected. In contrast, if a connected external capacitor Cext is relatively large, M4's gate voltage ramps up faster than the voltage at the source of M4, and M4 works as a switch to selectively conduct current from the third current source I3 to the external soft start terminal 114 to charge Cext. It is noted in this example, moreover, that the third current source I3 is not directly connected to the external soft start terminal 114, which is not the case in the implementation of FIG. 7 below. The charging current provided to Cext in the circuit of FIG. 2 is limited to 5 uA by this configuration, including subtraction of the 0.5 μA current sinked by M5 via the mirror connection of M5 and M6 and the 0.5 μA value of the current source I2 while M7 is turned on during startup. As a result, the soft start time in this case is primarily determined by the external capacitor Cext according to the following equation (1.2):

$$t_{ss\_ext}=(VREF \times Cext)/(I3-I2). \tag{1.2}$$

With continued reference to FIG. 2, the error amplifier 40 in this embodiment includes a fourth current source I4 providing a current for sharing between three PMOS error amplifier transistors M9, M10 and M11 which form a differential stage. The first transistor M9 has a source connected to I4, as well as a gate terminal connected directly to the source of M4 of the internal soft start output circuit 142b and also directly to the terminal 114 to provide the first error amplifier input 143 (+) and to receive the soft start input signal SS. The source of the second error amplifier transistor M10 is also connected to I4, and the gate of M10 is connected to provide the second error amplifier input 144 (+) and to receive the reference voltage signal VREF, where the drains of M9 and M10 are connected to a PMOS transistor M12 which forms a current mirror with another PMOS transistor M15 as shown in FIG. 2. In this manner, M9 and M10 provide a non-inverting (+) side of a differential pair at the input of the error amplifier 140.

The inverting (−) side of the error amplifier differential input is provided by the third error amplifier transistor M11 (PMOS) with a source connected to I4, a gate connected to provide the third error amplifier input 146 and to receive the feedback signal FB, and a drain connected to a PMOS transistor M13 which forms a current mirror with another PMOS transistor M14 as shown. The mirrored current flowing through M13, M14 is provided to a further (PMOS) current mirror M16, M17 with sources connected to the supply voltage V+ to provide a single ended error amplifier output signal 141 at a node connecting the drains of M17 and M15 as shown. This single ended error amplifier output signal 141 is then provided to the positive (+) input of the comparator 136 for comparison with the ramp signal 135 to generate the pulse width modulated comparator output signal 136a.

Figure 3:
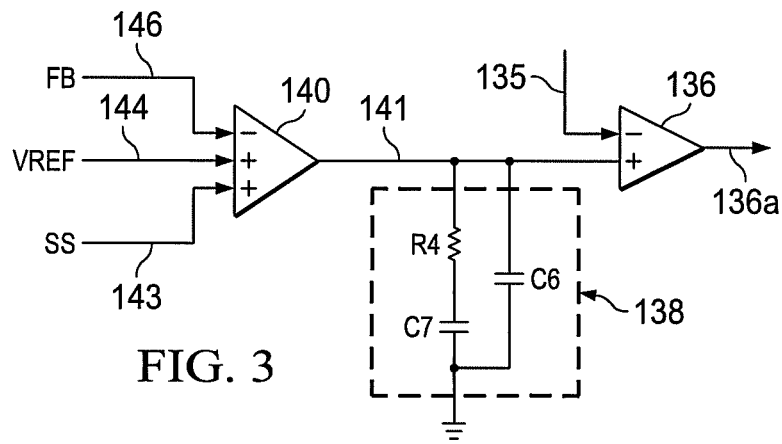
FIGS. 3 and 4 are schematic diagrams illustrating exemplary loop compensation circuits in the control circuit of FIGS. 1 and 2.
Figure 4:
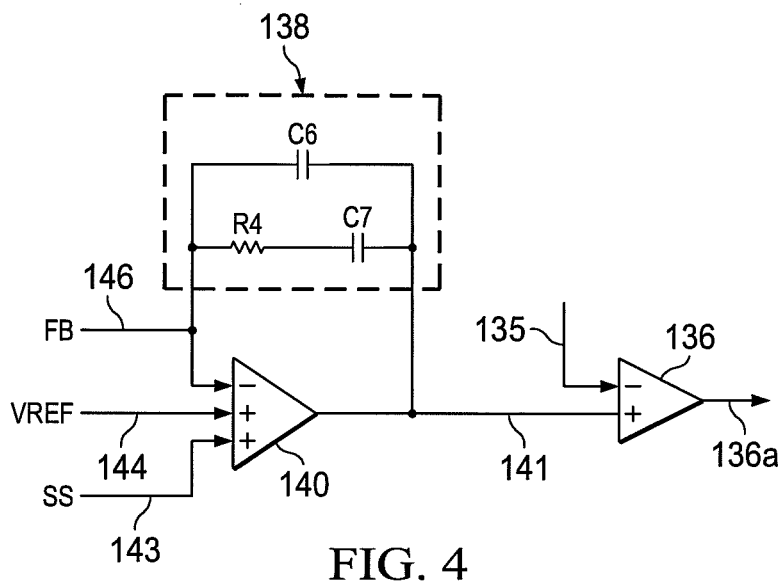

Referring also to FIGS. 3 and 4, the error amplifier output signal 141 is connected to a loop compensation circuit 138, and to the positive input of the comparator 136. As seen in FIG. 3, one possible loop compensation circuit 138 includes a resistor R4 connected in series with a capacitor C7 between the error amplifier output 141 and the circuit ground, with a capacitor C6 connected in parallel with the series combination of R4 and C7. FIG. 4 illustrates another non-limiting embodiment in which the loop compensation circuit 138 includes resistor R4 and capacitor C7 connected in series with one another between the output 141 of the error amplifier 140 and the feedback input 146, with the capacitor C6 connected in parallel with the series combination of R4 and C7.

Figure 5:
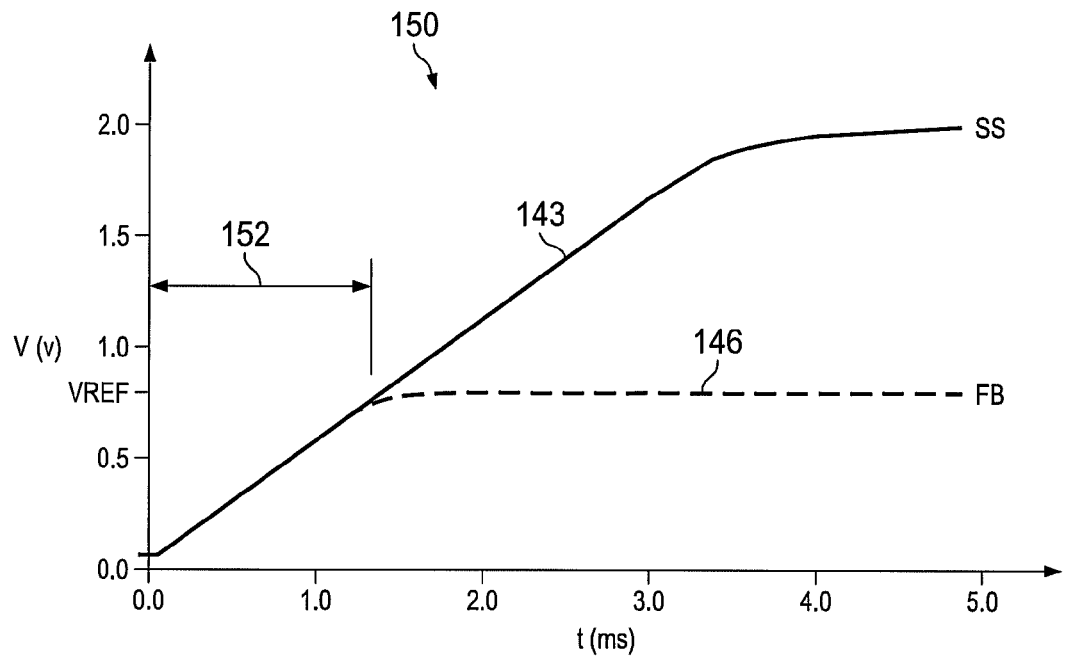
FIG. 5 is a graph illustrating an exemplary soft start circuit output signal and feedback signal in the control circuit of FIGS. 1 and 2.
Figure 6:
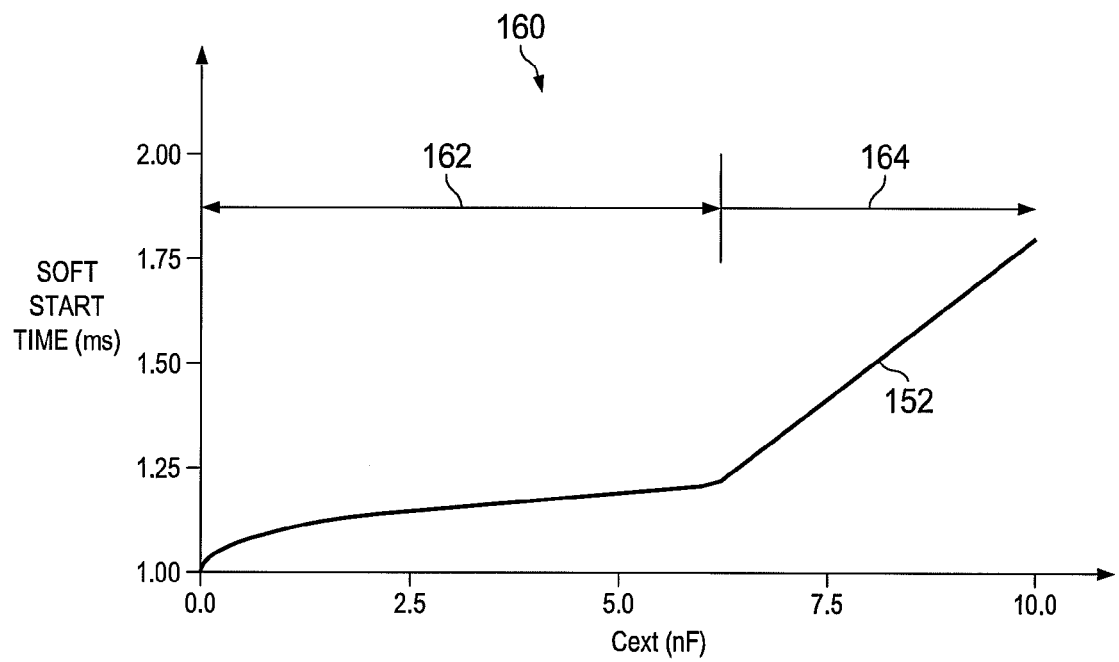
FIG. 6 is a graph illustrating soft start timing as a function of externally connected capacitance in the control circuit of FIGS. 1 and 2.

Referring now to FIGS. 5 and 6, FIG. 5 shows a graph 150 illustrating an exemplary soft start circuit output signal provided to the first error amplifier input 143 (SS), as well as an example feedback signal (FB) provided to the third error amplifier input 146 in the control circuit 100 above. In general, the soft start output signal SS is a linearly increasing ramp signal as shown, and operation of the error amplifier 140 causes the error amplifier output 141 to track the difference between the feedback signal FB at the input 146 and the lower of the reference voltage VREF at the second error amplifier input 144 and the soft start circuit output signal SS at the first input 143. Therefore, as seen in FIG. 5, the circuit 100 operates according to the soft start signal SS at the input 143 for a startup or soft start time 152 (approximately 1.3 ms in the illustrated example, with a relatively small external capacitor Cext connected to the terminal 114). Once the soft start signal at the input 143 reaches the reference voltage value VREF, the closed loop operation of the pulse generation circuitry drives the output voltage to attempt to track the reference value. It is noted again that in this case a constant reference voltage VREF is used (from the voltage reference current bias circuit 118 in FIG. 1), but an externally generated setpoint value could be provided as an input to the error amplifier 140, with the output voltage tracking the supplied setpoint value after the soft start signal SS reaches the setpoint level.

FIG. 6 provides a graph 160 illustrating soft start timing in milliseconds as a function of any externally connected capacitor Cext in the control circuit 100. As seen in the graph 160, the soft start time 152 in the illustrated example is approximately 1 ms for no externally connected capacitor or for a very small capacitor connected between the terminal 114 and the circuit ground, and rises somewhat asymptotically to about 1.2 ms for external capacitors Cext up to about 6 nF. As seen, therefore, the internal soft start circuit 142 primarily dominates the soft start time 152 in a first range 162 of external capacitance values, with the transistor M4 in FIG. 2 above operating primarily as a source follower. Larger values of Cext in a further capacitance range 164 cause the soft start time 152 to generally linearly increase, wherein the transistor M4 (FIG. 2 above) operates as a switch to conduct current from the third current source I3 to the terminal 114 for more slowly charging the external capacitor Cext.

Referring also to FIG. 7, the control circuit 100 and the soft start circuitry in FIGS. 1 and 2 above provide significant advantages compared to the use of separate error amplifier inputs for internal and external soft start circuits. In particular, FIG. 7 shows another PWM control circuit 200 with an internal soft start circuit 242 and an error amplifier 240. In this case, a current source I201, capacitor C201 and a current mirror M201, M202 form a capacitor amplifier, with M201 and M202 forming a first current mirror, PMOS transistors M203 and M204 forming a second current mirror, and NMOS transistors M205 and M206 forming a third current mirror operating according to a control PMOS transistor M207 and a second current source I202 to provide an internal soft start output signal SSINT to an input 243a of the error amplifier 240. In this case, the transistor M204 provides a source follower configuration, with a drain connected to the supply rail V+, and a source providing the internal soft circuit output signal to the error amplifier input 243a at the gate of a PMOS transistor M208 with a source connected to a shared current source I204.

Unlike the embodiment of FIGS. 1 and 2, a separate current source I203 is connected to the external capacitor terminal or pin 214 in FIG. 7 to provide charging current for charging up an external capacitor Cext (if connected). The external capacitor terminal 214, moreover, is connected to provide a separate input signal SSEXT to another soft start input 243b of the error amplifier 240 at the gate of a PMOS transistor M209. As in the implementation of FIG. 2, a further non-inverting PMOS transistor M210 receives a reference voltage as another input 244 to the error amplifier, and the lower of the input signals 243a, 243b and 244 is compared with a feedback signal provided to a fourth input 246 at the gate of another PMOS transistor M211. In this case, the four input transistors M208-M211 compete for current from the source I204 according to their respective inputs, with the resulting error amplifier output (single ended again in this case) being determined according to the difference between the feedback signal at the input 246 and the lower of the other input signals 243a, 243b and 244. In this case, however, the error amplifier 240 needs to include the four input PMOS transistors M208-M211, and these transistors are generally of significantly large device size in order to control offsets, whereby the circuit 100 of FIGS. 1 and 2 above provides significant die size savings compared with the circuit 200 of FIG. 7.

In addition, as mentioned above, matching problems are exacerbated by use of four transistors M208-M211 in the differential input stage of the error amplifier 240 in FIG. 7, and these matching problems are mitigated or reduced by the use of only three error amplifier inputs 143, 144 and 146 in FIG. 2 above. The various concepts of the present disclosure thus provide internal and external soft start circuitry which uses a shared error amplifier input 143, by which the device size and matching problems can be addressed in a simple solution.

Also, the drain of M204 is connected to V+ in FIG. 7, and therefore the current through M204 is not limited. In the novel circuit 100 of FIGS. 1 and 2, on the other hand, M4 operates like a switch when large external capacitances Cext are connected to the terminal 114 because the voltage across C1 (and hence the gate of M4) ramps up quickly. Connection of the source of M4 to the external capacitor Cext provides a limit to the maximum current to charge the external capacitor Cext to about 5.0 µA, and thus the maximum slew rate of the voltage across C2 of the soft circuit node SS is limited by I3 (connected to M4) and Cext. This limitation on the slew rate of the soft start circuit signal provided to the input 143 in FIG. 2 is particularly advantageous if the external capacitor Cext is very large, for example, where a user desires a relatively long soft start time (e.g., longer than the internal soft start circuit setting of 1 ms). Thus, for large external capacitance Cext, the soft started circuit slew rate is controlled by I3 and Cext.

The present disclosure thus provides an internal soft start circuit 142, and also allows a user to set a tailored soft start time by connection of an external capacitor to the terminal 114 for controlling or limiting the inrush current seen by the output capacitor C4 during startup of the DC-DC converter system. After the soft start operation is completed when the soft start output signal exceeds the reference voltage level VREF, the soft start circuitry 142 goes into low-power mode, and the buck converter output is essentially controlled in closed-loop fashion according to the feedback signal at the input 146.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of multiple implementations, such feature may be combined with one or more other features of other embodiments as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What is claimed is:

1. A control circuit for providing pulse width modulation (PWM) control of a DC-DC converter, the control circuit comprising:
    a pulse generation circuit, comprising:
        an error amplifier including a first error amplifier input receiving a soft start input signal, a second error amplifier input receiving a reference voltage signal, a third error amplifier input receiving a feedback signal representing an output condition of the DC-DC converter, and an output providing an error amplifier output signal representing a difference between the feedback signal and a lower one of the soft start signal and the reference voltage signal, and
        a comparator circuit comprising a first input receiving the error amplifier output signal, a second input receiving a periodic ramp signal, and an output providing a pulse width modulated output signal according to the error amplifier output signal and the periodic ramp signal;
    an internal soft start circuit, comprising:
        a capacitor amplifier circuit including a first capacitor with a first terminal connected to a first current source and a second terminal connected to a first current mirror circuit to provide a rising voltage at the first terminal of the first capacitor during startup of the control circuit,
        an output circuit providing a rising internal soft start circuit output signal to the first error amplifier input based at least partially on a voltage across the first capacitor during startup of the control circuit; and
    an external soft start terminal connected directly to the first error amplifier input to allow connection of an external capacitor between the first error amplifier input and a circuit ground to at least partially control a rise time of a voltage at the first error amplifier input during startup of the control circuit.

2. The control circuit of claim 1, wherein the output circuit of the internal soft start circuit comprises a source follower transistor configured as a source follower with a control terminal connected to the first terminal of the first capacitor and a source terminal connected directly to the first error amplifier input.

3. The control circuit of claim 2, wherein the output circuit of the internal soft start circuit comprises another current mirror circuit including a first transistor sinking a current from the source terminal of the source follower transistor to at least partially control a gate-source voltage of the source follower transistor according to the voltage across the first capacitor during startup of the control circuit.

4. The control circuit of claim 3, wherein the output circuit of the internal soft start circuit comprises a second current source controlling the level of current in the first transistor to be approximately equal to the current of the first current source.

5. The control circuit of claim 4, wherein the output circuit of the internal soft start circuit comprises a third current source providing a current to a drain terminal of the source follower transistor to limit a charging current of the external capacitor connected to the external soft start terminal.

6. The control circuit of claim 5, wherein the error amplifier comprises:
    a fourth current source; and
    a differential stage, including:
        a first error amplifier transistor with a source terminal connected to the fourth current source, a gate terminal connected directly to the output circuit of the internal soft start circuit to provide the first error amplifier input and to receive the soft start input signal, and a drain terminal,
        a second error amplifier transistor with a source terminal connected to the fourth current source, a gate terminal connected to provide the second error amplifier input and to receive the reference voltage signal, and a drain terminal connected to the drain terminal of the first error amplifier transistor, and
        a third error amplifier transistor with a source terminal connected to the fourth current source, and a gate terminal connected to provide the third error amplifier input and to receive the feedback signal.

7. The control circuit of claim 3, wherein the output circuit of the internal soft start circuit comprises a third current source providing a current to a drain terminal of the source follower transistor to limit a charging current of the external capacitor connected to the external soft start terminal.

8. The control circuit of claim 3, wherein the error amplifier comprises:
    a fourth current source; and
    a differential stage, including:
        a first error amplifier transistor with a source terminal connected to the fourth current source, a gate terminal connected directly to the output circuit of the internal soft start circuit to provide the first error amplifier input and to receive the soft start input signal, and a drain terminal,
        a second error amplifier transistor with a source terminal connected to the fourth current source, a gate terminal connected to provide the second error amplifier input and to receive the reference voltage signal, and a drain terminal connected to the drain terminal of the first error amplifier transistor, and
        a third error amplifier transistor with a source terminal connected to the fourth current source, and a gate terminal connected to provide the third error amplifier input and to receive the feedback signal.

9. The control circuit of claim 2, wherein the output circuit of the internal soft start circuit comprises a third current source providing a current to a drain terminal of the source follower transistor to limit a charging current of the external capacitor connected to the external soft start terminal.

10. The control circuit of claim 9, wherein the third current source is not directly connected to the external soft start terminal.

11. The control circuit of claim 2, wherein the error amplifier comprises:
   a fourth current source; and
   a differential stage, including:
      a first error amplifier transistor with a source terminal connected to the fourth current source, a gate terminal connected directly to the output circuit of the internal soft start circuit to provide the first error amplifier input and to receive the soft start input signal, and a drain terminal,
      a second error amplifier transistor with a source terminal connected to the fourth current source, a gate terminal connected to provide the second error amplifier input and to receive the reference voltage signal, and a drain terminal connected to the drain terminal of the first error amplifier transistor, and
      a third error amplifier transistor with a source terminal connected to the fourth current source, and a gate terminal connected to provide the third error amplifier input and to receive the feedback signal.

12. The control circuit of claim 1, wherein the error amplifier comprises:
   a fourth current source; and
   a differential stage, including:
      a first error amplifier transistor with a source terminal connected to the fourth current source, a gate terminal connected directly to the output circuit of the internal soft start circuit to provide the first error amplifier input and to receive the soft start input signal, and a drain terminal,
      a second error amplifier transistor with a source terminal connected to the fourth current source, a gate terminal connected to provide the second error amplifier input and to receive the reference voltage signal, and a drain terminal connected to the drain terminal of the first error amplifier transistor, and
      a third error amplifier transistor with a source terminal connected to the fourth current source, and a gate terminal connected to provide the third error amplifier input and to receive the feedback signal.

13. The control circuit of claim 1, wherein the output circuit of the internal soft start circuit comprises:
   a second current mirror circuit including a first transistor connected between the first current mirror circuit and the first terminal of the first capacitor, and a second transistor connected between the first terminal of the first capacitor and the first error amplifier input, the first and second transistors of the second current mirror circuit having control terminals connected to the first terminal of the first capacitor;
   a third current mirror circuit including a first transistor, and a second transistor connected to the second transistor of the second current mirror circuit; and
   a second current source;
   a transistor connected between the second current source and the first transistor of the third current mirror circuit, the transistor having a control terminal connected to the first terminal of the first capacitor and operative to control current flow from the second current source to the third current mirror circuit to maintain a conduction state of the second transistor of the second current mirror circuit during startup of the control circuit.

14. The control circuit of claim 13, wherein the second transistor of the second current mirror circuit is configured as a source follower with a source terminal connected to the second transistor of the third current mirror circuit and to the first error amplifier input, wherein the second transistor of the second current mirror circuit operates as a source follower when no external capacitor is connected to the external soft start terminal to provide the rising internal soft start circuit output signal to the first error amplifier input having a voltage generally equal to the voltage across the first capacitor during startup of the control circuit.

15. The control circuit of claim 14, wherein the output circuit of the internal soft start circuit comprises a third current source providing a current to a drain terminal of the second transistor of the second current mirror circuit to limit a charging current of the external capacitor, if the external capacitor is connected to the external soft start terminal, wherein the second transistor of the second current mirror circuit provides the soft start circuit output signal to the first error amplifier input having a voltage generally equal to a lower one of the voltage across the first capacitor and a voltage across the external capacitor.

16. The control circuit of claim 15, wherein the error amplifier comprises:
   a fourth current source; and
   a differential stage, including:
      a first error amplifier transistor with a source terminal connected to the fourth current source, a gate terminal connected directly to the output circuit of the internal soft start circuit to provide the first error amplifier input and to receive the soft start input signal, and a drain terminal,
      a second error amplifier transistor with a source terminal connected to the fourth current source, a gate terminal connected to provide the second error amplifier input and to receive the reference voltage signal, and a drain terminal connected to the drain terminal of the first error amplifier transistor, and
      a third error amplifier transistor with a source terminal connected to the fourth current source, and a gate terminal connected to provide the third error amplifier input and to receive the feedback signal.

17. The control circuit of claim 15, wherein the third current source is not directly connected to the external soft start terminal.

18. A control circuit for providing pulse width modulation (PWM) control of a DC-DC converter, the control circuit comprising:
   a pulse generation circuit, comprising:
      an error amplifier including a first error amplifier input receiving a soft start input signal, a second error amplifier input receiving a reference voltage signal, a third error amplifier input receiving a feedback signal representing an output condition of the DC-DC converter, and an output providing an error amplifier output signal representing a difference between the feedback signal and a lower one of the soft start signal and the reference voltage signal, and
      a comparator circuit comprising a first input receiving the error amplifier output signal, a second input receiving a periodic ramp signal, and an output providing a pulse width modulated output signal according to the error amplifier output signal and the periodic ramp signal; and
   a soft start circuit, comprising:

an internal ramp circuit provide a rising internal soft start voltage signal having a fixed rate of change during startup of the control circuit, a source follower transistor with a gate terminal directly connected to the rising internal soft start voltage signal, and a source terminal directly connected to the first error amplifier input, and an external soft start terminal directly connected to the source terminal of the source follower transistor and to the first error amplifier input to allow connection of an external capacitor between the first error amplifier input and a circuit ground, wherein the soft start circuit provides a signal to the first error amplifier input having a voltage generally equal to a lower one of the voltage across the first capacitor and a voltage across the external capacitor, if connected to the external soft start terminal.

19. The control circuit of claim 18, wherein the soft start circuit comprises a current source providing a current to a drain terminal of the source follower transistor to limit a charging current of the external capacitor, if the external capacitor is connected to the external soft start terminal.

20. The control circuit of claim 18, wherein the error amplifier comprises:
   a current source; and
   a differential stage, including:
      a first error amplifier transistor with a source terminal connected to the current source, a gate terminal connected directly to the first error amplifier input to receive the soft start input signal, and a drain terminal,
      a second error amplifier transistor with a source terminal connected to the current source, a gate terminal connected to provide the second error amplifier input and to receive the reference voltage signal, and a drain terminal connected to the drain terminal of the first error amplifier transistor, and
      a third error amplifier transistor with a source terminal connected to the current source, and a gate terminal connected to provide the third error amplifier input and to receive the feedback signal.

\* \* \* \* \*